US008884525B2

(12) United States Patent
Hoffman et al.

(10) Patent No.: US 8,884,525 B2
(45) Date of Patent: Nov. 11, 2014

(54) REMOTE PLASMA SOURCE GENERATING A DISC-SHAPED PLASMA

(75) Inventors: Daniel J. Hoffman, Fort Collins, CO (US); Daniel Carter, Fort Collins, CO (US); Randy Grilley, Ault, CO (US); Karen Peterson, Loveland, CO (US)

(73) Assignee: Advanced Energy Industries, Inc., Fort Collins, CO (US)

( * ) Notice: Subject to any disclaimer, the term of this patent is extended or adjusted under 35 U.S.C. 154(b) by 137 days.

(21) Appl. No.: 13/425,159

(22) Filed: Mar. 20, 2012

(65) Prior Publication Data

US 2012/0242229 A1 Sep. 27, 2012

Related U.S. Application Data

(60) Provisional application No. 61/466,024, filed on Mar. 22, 2011.

(51) Int. Cl.

*H05B 31/26* (2006.01)
*B23K 10/00* (2006.01)
*H05H 1/46* (2006.01)

(52) U.S. Cl.

CPC ......... *H05H 1/46* (2013.01); *H05H 2001/4652* (2013.01)
USPC ............ 315/111.21; 315/111.51; 315/111.41; 315/111.71; 315/111.91; 219/121.4; 219/121.41

(58) Field of Classification Search

USPC ............. 315/111.21, 111.41, 111.51, 111.71, 315/111.91; 219/121.4, 121.41, 121.43, 219/121.52, 121.54, 121.57
See application file for complete search history.

(56) References Cited

U.S. PATENT DOCUMENTS

| | | | | |
|---|---|---|---|---|
| 5,487,785 | A | 1/1996 | Horiike et al. | |
| 5,859,404 | A * | 1/1999 | Wei et al. | 219/121.43 |
| 5,859,428 | A | 1/1999 | Fruchtman | |
| 6,156,667 | A | 12/2000 | Jewett | |
| 6,291,938 | B1 | 9/2001 | Jewett et al. | |
| 6,326,584 | B1 | 12/2001 | Jewett et al. | |
| 6,392,210 | B1 | 5/2002 | Jewett et al. | |
| 6,707,051 | B2 | 3/2004 | Shun'ko | |
| 6,724,148 | B1 | 4/2004 | Gonzalez et al. | |
| 6,819,096 | B2 | 11/2004 | Gonzalez et al. | |
| 6,822,396 | B2 | 11/2004 | Gonzalez et al. | |

(Continued)

FOREIGN PATENT DOCUMENTS

| | | | |
|---|---|---|---|
| JP | 04-193329 | A | 7/1992 |
| WO | 2012103101 | A1 | 8/2012 |

OTHER PUBLICATIONS

Helmholtz Coil, 4 pages, Feb. 26, 2009, Wikipedia.

(Continued)

*Primary Examiner* — Vibol Tan
(74) *Attorney, Agent, or Firm* — Neugeboren O'Dowd PC

(57) ABSTRACT

Disclosed herein are systems, methods and apparatuses for dissociating a non-activated gas through a disc-shaped plasma in a remote plasma source. Two inductive elements, one on either side of the disc-shaped plasma, generate a magnetic field that induces electric fields that sustain the disc-shaped plasma. The inductive elements can be coiled conductors having any number of loops and can be arranged in planar or vertical coils or a combination of planar and vertical coils. Additionally, the ratio of inductive element radius to gap distance between the two inductive elements can be configured to achieve a desired vertical plasma confinement.

10 Claims, 8 Drawing Sheets

(56) References Cited

U.S. PATENT DOCUMENTS

| | | | | |
|---|---|---|---|---|
| 6,927,358 | B2 | 8/2005 | Gonzalez et al. | |
| 6,946,063 | B1 | 9/2005 | Gonzalez et al. | |
| 7,005,845 | B1 | 2/2006 | Gonzalez et al. | |
| 7,161,112 | B2 * | 1/2007 | Smith et al. | 219/121.57 |
| 7,245,084 | B1 | 7/2007 | Gonzalez et al. | |
| 7,468,494 | B2 | 12/2008 | Gonzalez et al. | |
| 7,569,790 | B2 * | 8/2009 | Holber et al. | 219/121.41 |
| 7,969,096 | B2 | 6/2011 | Chen | |
| 8,124,906 | B2 * | 2/2012 | Holber et al. | 219/121.41 |
| 2001/0014540 | A1 | 8/2001 | Shan et al. | |
| 2003/0015965 | A1 * | 1/2003 | Godyak | 315/111.21 |
| 2004/0094402 | A1 | 5/2004 | Gopalraja et al. | |
| 2006/0086699 | A1 * | 4/2006 | Holber et al. | 219/121.54 |
| 2006/0130971 | A1 | 6/2006 | Chang et al. | |
| 2008/0083609 | A1 * | 4/2008 | Shao et al. | 204/164 |
| 2008/0083701 | A1 * | 4/2008 | Shao et al. | 216/58 |
| 2008/0152903 | A1 * | 6/2008 | Von Kaenel | 428/337 |
| 2011/0095689 | A1 | 4/2011 | Gilbert | |
| 2011/0226617 | A1 | 9/2011 | Hofmann et al. | |
| 2012/0187844 | A1 | 7/2012 | Brouk et al. | |
| 2012/0217221 | A1 | 8/2012 | Hoffman et al. | |

OTHER PUBLICATIONS

Jeon, M., et al., "Hydrogenated amorphous silicon film as intrinsic passivation layer deposited at various temperatures using RF remote-PECVD technique", Current Applied Physics, Nov. 12, 2009, pp. S237-S240, vol. 10, (2010), Publisher: Elsevier B.V., Published in: US.

Bruno, G., et al., "Real time ellipsometry for monitoring plasma-assisted epitaxial growth of GaN", Applied Surface Sci., Jul. 7, 2006, pp. 219-223, vol. 253, (2006), Publisher: Elsevier B.V., Published in: US.

Giangregorio, M.M., et al., "Role of plasma activation in tailoring the nanostructure of multifunctional oxides thin films", Applied Surface Sci., Sep. 10, 2008, pp. 5396-5400, vol. 255, (2009), Publisher: Elsevier B.V., Published in: US.

Hoffman, D., et al., "Specification for related U.S. Appl. No. 13/173,752", filed Jun. 30, 2011, p. 48, to be published in: US.

Vahedi, V., et al., "Verification of frequency scaling laws for capacitive radio-frequency discharges using two-dimensional simulations", Phys. Fluids B Jul. 1993, pp. 2719-2729, vol. 5, No. 7, Publisher: Am. Inst. of Physics, Published in: US.

Rauf, S., et al., "Nonlinear Dynamics of Radio Frequency Plasma Processing Reactors Powered by Multifrequency Sources", IEEE Transactions on Plasma Science, Oct. 5, 1999, pp. 1329-1338, vol. 27, No. 5, Publisher: IEEE.

Raoux, S., et al., "Remote microwave plasma source for cleaning chemical vapor deposition chambers; Technology for reducing global warming gas emissions", J. Vac. Sci. Technol. B Mar./Apr. 1999, pp. 477-485, vol. 17, No. 2, Publisher: Am. Vacuum Soc'y, Published in: US.

Gangoli, S.P., et al., "Production and transport chemistry of atomic fluorine in remote plasma source and cylindrical reaction chamber", J. Phys. D: Appl. Phys., pp. 5140-5154, vol. 40, (2007), Publisher: IOP Publishing Ltd., Published in: UK.

Yun, Y.B., et al., "Effects of various additive gases on chemical dry etching rate enhancement of low-k SiOCH layer in F2/Ar remote plasmas", Thin Solid Films, Aug. 15, 2007, pp. 3549-3553, vol. 516, (2008), Publisher: Elsevier B.V., Published in: US.

Kuo, M.S., et al., "Influence of C4F8/Ar-based etching and H2-based remote plasma ashing processes on ultralow k materials modifications", J. Vac. Sci. Technol. B Mar./Apr. 2010, Mar. 19, 2010, pp. 284-294, vol. 28, No. 2, Publisher: Am. Vacuum Soc'y, Published in: US.

Heil, S.B.S., et al., "Deposition of TiN and HfO2 in a commercial 200 mm plasma atomic layer deposition reactor", J. Vac. Sci. Technol. A Sep./Oct. 2007, Jul. 31, 2007, pp. 1357-1366, vol. 25, No. 5, Publisher: Am. Vacuum Soc'y, Published in: US.

Kim, J.Y., et al., "Remote plasma enhanced atomic layer deposition of TiN thin films using metalorganic precursor", J. Vac. Sci. Technol. A Jan./Feb. 2004, Nov. 13, 2003, pp. 8-12, vol. 22, No. 1, Publisher: Am. Vacuum Soc'y, Published in: US.

Wakeham, S.J., et al., "Low temperature remote plasma sputtering of indium tin oxide for flexible display applications", Thin Solid Films, May 12, 2009, pp. 1355-1358, vol. 519, (2009), Publisher: Elsevier B.V.

Ohachi, T., et al., "Measurement of nitrogen atomic flux for RF-MBE growth of GaN and AlN on Si substrates", J. of Crystal Growth, pp. 2987-2991, vol. 311, (2009), Publisher: Elsevier B.V.

Honda, S., et al., "Hydrogenation of polycrystalline silicon thin films", Thin Solid Films, Oct. 5, 2005, pp. 144-148, vol. 501, (2006), Publisher: Elsevier B.V., Published in: US.

Bryns, B., et al., "A VHF driven coaxial atmospheric air plasma: electrical and optical characterization", Dec. 16, 2011, pp. 1-18, No. Rev. 2-0, Publisher: N. C. St. U., Dep't of Nuclear Eng., Published in: US.

Emsellem, G., "Electrodeless Plasma Thruster Design Characteristics", Jul. 11, 2005, Publisher: 41st Joint Propulsion Conference, Tucson, Published in: US.

George, M.A., et al., "Silicon Nitride Arc Thin Films by New Plasma Enhanced Chemical Vapor Deposition Source Technology", Jul. 7, 2011, Publisher: Article downloaded from www.generalplasma.com, Published in: US.

Krolak, M, "Matthew Krolak's MyElectricEngine.Com—Magnetoplasmadynamic (MPD) Thruster Design", Apr. 28, 2011, Publisher: Webpage downloaded from http://myelectricengine.com/projects/mpdthruster/mpdthruster.html, Published in: US.

Rabbani, Firoozeh, International Search Report and Written Opinion re application No. PCT/US2012/022380, Mar. 14, 2012, Published in: AU.

Devlin, Martin, International Search Report and Written Opinion re application No. PCT/US2012/029953, May 28, 2012, p. 11 Published in: AU.

Nakamura, Yukari, "International Preliminary Report on Patentability re Application No. PCT/US2012/029953", Oct. 3, 2013, p. 9 Published in: CH.

* cited by examiner

REMOTE PLASMA SOURCE GENERATING A DISC-SHAPED PLASMA

FIELD OF THE INVENTION

The present invention relates generally to plasma processing. In particular, but not by way of limitation, the present invention relates to systems, methods and apparatuses for dissociating a reactive gas into radicals.

BACKGROUND OF THE INVENTION

Passing a gas through a plasma can excite the gas and produce activated gases containing ions, free radicals, atoms and molecules. Activated gases and free radicals are used for numerous industrial and scientific applications including processing solid materials such as semiconductor wafers, powders, and other gases. Free radicals are also used to remove deposited thin films from semiconductor processing chamber walls.

Where activated gases or free radicals are used in processing, it may be desirable to preclude the plasma from interacting with the processing chamber or semiconductors being processed. Remote plasma sources can fill this need by generating the plasma, activated gases, and/or free radicals in a chamber that is isolated from the processing chamber, and then passing only the activated gases and/or free radicals to the processing chamber.

Plasmas can be generated in various ways, including DC discharge, radio frequency (RF) discharge, and microwave discharge. DC discharges are achieved by applying a potential between two electrodes in a gas. Plasmas generated via RF and DC currents can produce high-energy ions able to etch or remove polymers, semiconductors, oxides, and even metals. Therefore, RF or DC-generated plasmas are often in direct contact with the material being processed. Microwave discharges produce dense, low ion energy plasmas and, therefore, are often used to produce streams of activated gas for "downstream" processing. Microwave discharges are also useful for applications where it is desirable to generate ions at low energy and then accelerate the ions to the process surface with an applied potential.

Existing remote sources (e.g., toroidal and linear remote sources) have four main drawbacks. First, they fail to pull the plasma away from the remote source chamber walls thus allowing the plasma to etch the chamber walls. This will be referred to as poor plasma confinement. Second, they use a high power density to sustain the plasma, which generates high energy ions that bombard the remote source chamber walls and the processing chamber walls. Ion bombardment can also damage the wafers or other semiconductors being processed in the process chamber (e.g., etching low-k dielectrics). Third, toroidal and linear remote sources have significant electrostatic coupling to the plasma, which leads to further ion bombardment. Finally, these sources provide a narrow plasma cross-section through which non-activated or non-ionized gas can pass through. Thus, they may be limited in their effectiveness at dissociating non-activated gas.

SUMMARY

Illustrative embodiments of the present disclosure are shown in the drawings and summarized below. These and other embodiments are more fully described in the Detailed Description section. It is to be understood, however, that there is no intention to limit the claims herein to the forms described in this Summary or in the Detailed Description.

One skilled in the art can recognize that there are numerous modifications, equivalents, and alternative constructions that fall within the spirit and scope of the present disclosure as expressed in the claims.

In one embodiment, the invention may be characterized as a remote plasma source. In this embodiment, the remote plasma source includes a first inductive coil having a first plurality of loops and a second inductive coil having a second plurality of loops, wherein the first and second inductive coils are parallel to each other. The first and second inductive coils are configured to conduct an alternating current to generate magnetic fields that sustain a disc-shaped plasma between the first and second inductive coils, wherein the alternating current sustains the disc-shaped plasma primarily through inductive coupling. And a chamber disposed between the first and second inductive coils, and configured to enclose the disc-shaped plasma.

Another aspect of the invention may be characterized as a method for providing a reactive gas to a remote plasma source chamber. The method includes passing a high voltage current through a first inductor and a second inductor to generate an electric field passing from the first inductor through the remote plasma source chamber and to the second inductor wherein the electric field is strong enough to ignite a plasma in the reactive gas in the remote plasma source chamber. In addition, an alternating current is passed through the first inductor and the second inductor to inductively induce minor electric fields in the plasma. The reactive gas is dissociated by passing it through the plasma to form activated gas and free radicals, and the activated gas and free radicals are removed from the remote plasma source chamber.

Another aspect of the invention may be characterized as a system that includes a remote plasma source chamber having parallel first and second surfaces, a first coiled conductor arranged outside the remote plasma source chamber and adjacent to the first surface of the remote plasma source chamber, a first dielectric arranged between the first surface and the first coiled conductor, a second coiled conductor arranged outside the remote plasma source chamber and adjacent to the second surface of the remote plasma source chamber, and a second dielectric arranged between the second surface and the second coiled conductor. In addition, a reactive gas entry directs a reactive gas into the remote plasma source chamber and a radicals exit port removes radicals formed when the reactive gas is passed through the plasma disc formed in the remote plasma source chamber.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings where like or similar elements are designated with identical reference numerals throughout the several views and wherein:

DETAILED DESCRIPTION

Applicants have found that the deficiencies of existing remote sources (e.g., toroidal and linear remote sources) can be solved via a remote plasma source having two circular or coiled conductors. The use of two conductors with mirrored AC passing through them achieves far greater plasma confinement and lower plasma densities than the prior art. This is in part due to the creation of a disc-shaped plasma rather than a toroidal or tubular plasma as seen in the prior art. Additionally, the disc-shaped plasma presents a greater cross section through which non-activated gas can be passed. The two circular or coiled conductors can be spaced from each other and have a radius per winding that falls within a range of values that allow the plasma to be sustained with low power density, low electrostatic coupling, and that will confine the plasma to a much greater extent than the prior art.

Figure 1:
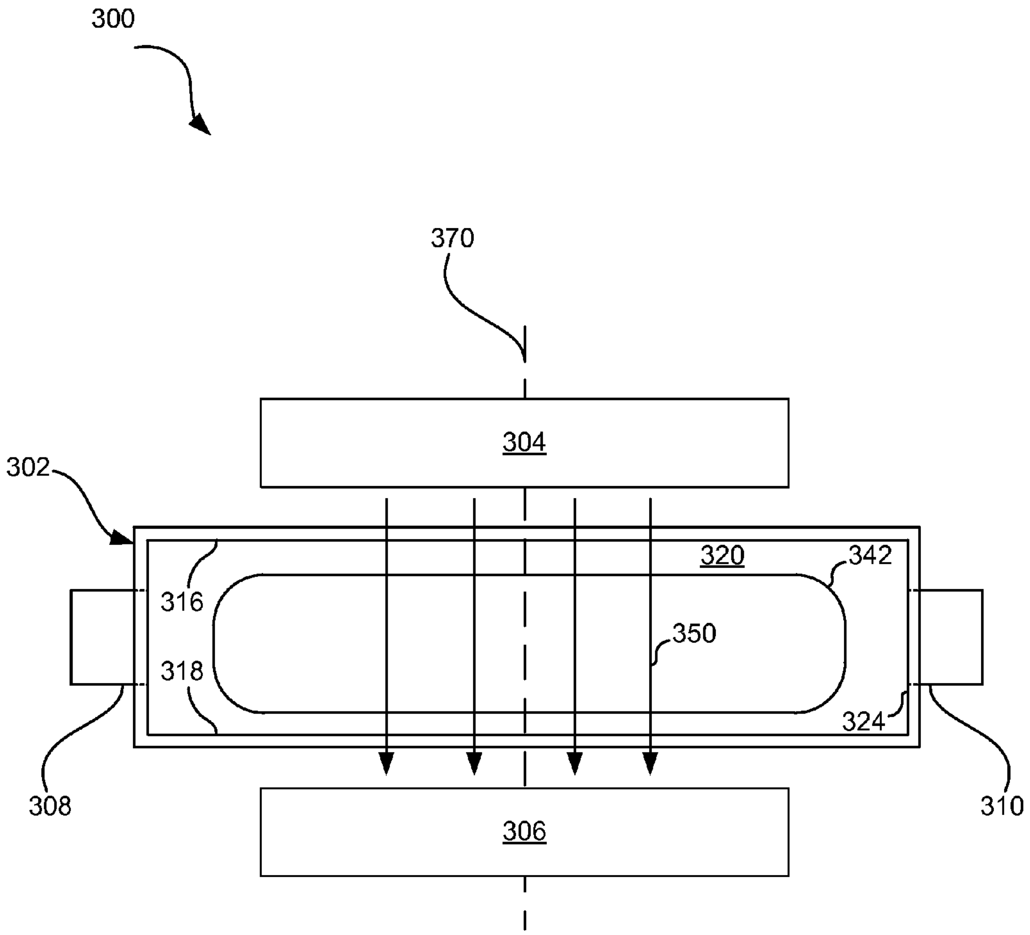
FIG. 1 illustrates a profile view of an embodiment of an exemplary remote plasma source.

FIG. 1 illustrates a profile view of an embodiment of a remote plasma source as described in this disclosure. The remote plasma source 300 includes a remote plasma source chamber 302 that encloses a volume 320 in which the plasma 342 is confined. As shown, the volume 320 in this embodiment is bounded by a first inner surface 316, a second inner surface 318, and a third inner surface 324. In addition, the remote plasma source 300 includes a first inductive element 304 and a second inductive element 306. When AC current is passed through the first and second inductive elements 304, 306 an alternating magnetic field 350 passes in the vertical direction (parallel to the axis 370) between the first and second inductive elements 304, 306. The alternating magnetic field 350 induces electrical fields that circulate around axis 370 and induce currents in the plasma 342 that sustain the plasma 342. The remote plasma source 300 includes a gas entry 308 and a gas exit 310 for providing non-activated gas to the remote plasma source chamber 302 and for removing activated gas and free radicals from the remote plasma source chamber 302, respectively.

Although a single inductive element, 304 or 306 could be used to sustain the plasma 342, vertical containment would be poor because a single inductive element would cause the plasma 342 to have a high density near the first or second inner surface 316, 318, depending on whether the first inductive element 304 or the second inductive element 306 is used. This high plasma density near either surface 316, 318 would cause undesired etching of the inside of the remote plasma source chamber 302; thus to pull the plasma 342 off of one of the walls, two inductive elements 304, 306 in the exemplary embodiment are used. In this way, the plasma 342 is vertically contained away from both of the inner surfaces 316, 318 to an extent previously unseen.

In addition, vertical confinement may be further enhanced by selecting certain ratios of the radii of the inductive elements 304, 306 versus a distance between the inductive elements 304, 306. For particular ratios, a potential energy of the plasma 342 is such that the plasma 342 is further confined to a center of the volume 320. For instance, a nitrogen plasma density in the $10^{11}$ to $10^{12}$ $cm^{-3}$ range can be pulled off the walls for the dual coils configured to produce ~7 Gauss rms at the center of the plasma.

Figure 2:
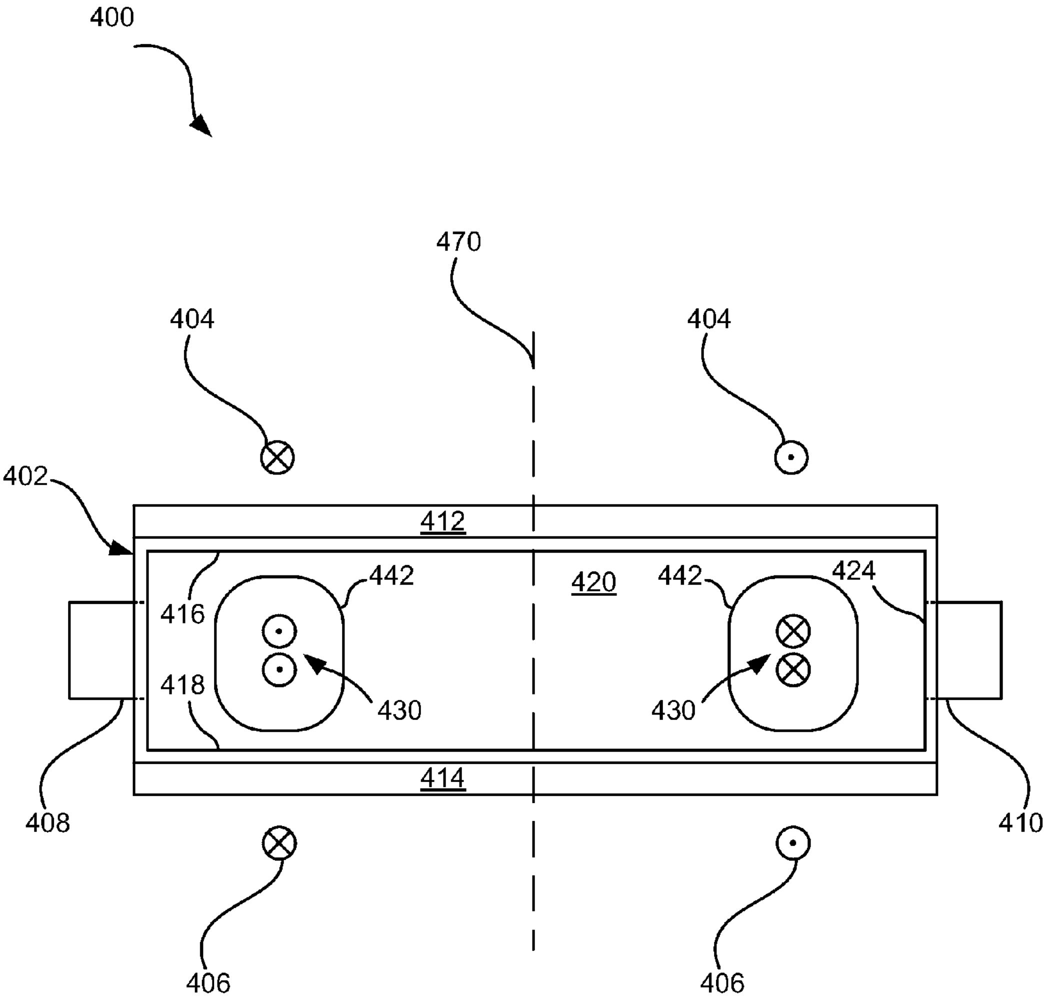
FIG. 2 illustrates a profile view of an embodiment of a remote plasma source as described in this disclosure.

FIG. 2 illustrates a profile view of another embodiment of a remote plasma source 400. The remote plasma source 400 includes a remote plasma source chamber 402 in which a plasma 442 is confined. As depicted the chamber includes a volume 420 that is bounded by a first inner surface 416, a second inner surface 418, and a third inner surface 424. The remote plasma source 400 includes a first and second conductor 404, 406, and in the illustrated embodiment, current in the conductors 404, 406 directed into the page is indicated by a circle enclosing an “x” and current directed out of the page is indicated by a circle enclosing a dot. These currents generate the induced electric fields 430 in the plasma 442, which in turn generate image currents at the same location as the induced electric fields 430. As shown, the remote plasma source 400 includes a first dielectric 412 arranged between the first conductor 404 and the remote plasma source chamber 402 and a second dielectric 414 is arranged between the second conductor 406 and the remote plasma source chamber 402. The remote plasma source 400 includes a gas entry 408 and a gas exit 410.

The remote plasma source chamber 402 can be made of a ceramic or any other material that allows passage of a magnetic field generated by the conductors 404, 406. The remote plasma source chamber 402 can be shaped like a cylinder (viewed here in profile). And from above, the remote plasma source chamber 402 appears as a circle. And the first and second inner surfaces 416, 418 can be parallel to each other and perpendicular to an axis 470. The third inner surface 424 can be perpendicular to the first and second inner surfaces 416, 418, and parallel to and radially disposed around the axis 470. In this embodiment, the axis 470 passes through a middle or center of the remote plasma source chamber 402 such that the third inner surface 424 is always equidistant from the axis 470.

As depicted, the dielectrics 412, 414 can touch an outer surface of the remote plasma source chamber 402 and can be separated by corresponding air gaps from the conductors 404, 406. The air gaps along with the dielectrics 412, 414 impede electric fields generated by the conductors 404, 406 directed towards the plasma 442. As such, the dielectrics 412, 414 and the air gap decrease electrostatic coupling between the conductors 404, 406 and the plasma 442. In one variation of the present embodiment, a faraday shield can be arranged between the dielectrics 412, 414 and the conductors 404, 406 to further reduce electrostatic coupling to the plasma 442. In another variation of the present embodiment, the dielectrics 412, 414 can touch the conductors 404, 406.

The gas entry 408 can be configured to provide non-activated gas to the volume 420. The gas entry 408 can be arranged to be flush with the third inner surface 424 such that the gas entry 408 does not protrude into the volume 420. In such an embodiment, the non-activated gas enters the volume 420 at a radius from the axis 470 equal to the radius of the third inner surface 424. In an alternative embodiment, the gas entry 408 can be arranged within the volume 420 such that the non-activated gas enters the volume 420 at a radius less than the radius of the third inner surface 424. For instance, the gas entry 408 can be arranged to release non-activated gas into the volume 420 at a radius equal to the radius from the axis 470 of the conductors 404, 406. The gas entry 408 can be arranged at an angle and radius from the axis 470 that enables the non-activated gas to be released into the volume 420 at a point and direction tangential to, or near tangential to the plasma 442.

The gas entry 408 can also be positioned and directed to release gas tangential to the electric fields. For example, the gas entry 408 can be arranged at a position and angle tangential to the conductors 404, 406. In other words, assuming an imaginary cylinder is formed that passes through both conductors 404, 406, the gas entry 408 can be aligned tangential to the imaginary cylinder. In terms of vertical orientation, the gas entry 408 can be arranged midway between the first and second conductors 404, 406. The gas entry 408 can release non-activated gas in a direction parallel to the conductors 404, 406.

In contrast to typical linear remote plasma sources, which release and flow non-activated gas in a direction parallel with the respective magnetic fields, the non-activated gas in the present embodiment can be released into the volume 420 in a direction perpendicular to the vertical magnetic fields generated by the conductors 404, 406.

The gas exit 410 can be configured to remove or allow the release of activated gas and free radicals from the volume 420. A lifetime of the plasma's 442 prevents it from diffusing through or being pulled through the gas exit 410 before the plasma is extinguished. The gas exit 410 can be arranged flush with the third inner surface 424 and can provide a path for activated gas and free radicals to be transported to a processing chamber (not illustrated).

The first and second conductors 404, 406 can be parallel to each other, and they can have a circular or coiled shape. In the illustrated embodiment, the conductors 404, 406 have a circular shape with a constant radius. This can be referred to as a single-loop or single-winding embodiment. However, it is to be understood that the conductors 404, 406 can also be coiled in a spiral formation, and thus have a varying radius. In the illustrated embodiment, the radius of the outermost portion of the conductors 404, 406 is less than the radius of the third inner surface 424. This prevents plasma from being sustained too close to the third inner surface 424 and thus helps ensure radial plasma confinement.

How far, in terms of the radial distance from the axis 470, the third inner surface 424 is located from the conductors 404, 406 accounts for inherent plasma expansion. More specifically, the magnetic field causes the plasma to have a radial force pushing it outwards towards the third inner surface 424, but the plasma does not reach the third inner surface 424 because it is extinguished as it moves away from the induced electric fields 430. As such, when the conductors 404, 406 are arranged at least a minimum distance inside the radius of the third inner surface 424, the plasma is self-containing in the radial directions. Thus, etching of the third inner surface 424 can be avoided.

Each conductor 404, 406 can be connected to an alternating current source such that the polarity, amplitude, and phase in each conductor 404, 406 are equal. Multiple current sources can also be used. The voltage from one end of each conductor 404, 406 to another end of each conductor 404, 406 is highly flexible. For instance, the conductors 404, 406 can each have a potential difference of 1 V, but the high and low potential can be +0.25 V and −0.75 V. As another example, the potential difference could be 1 V, but the high and low potential can be 0 V and 1.0V. Numerous other combinations are also possible.

Figure 6:
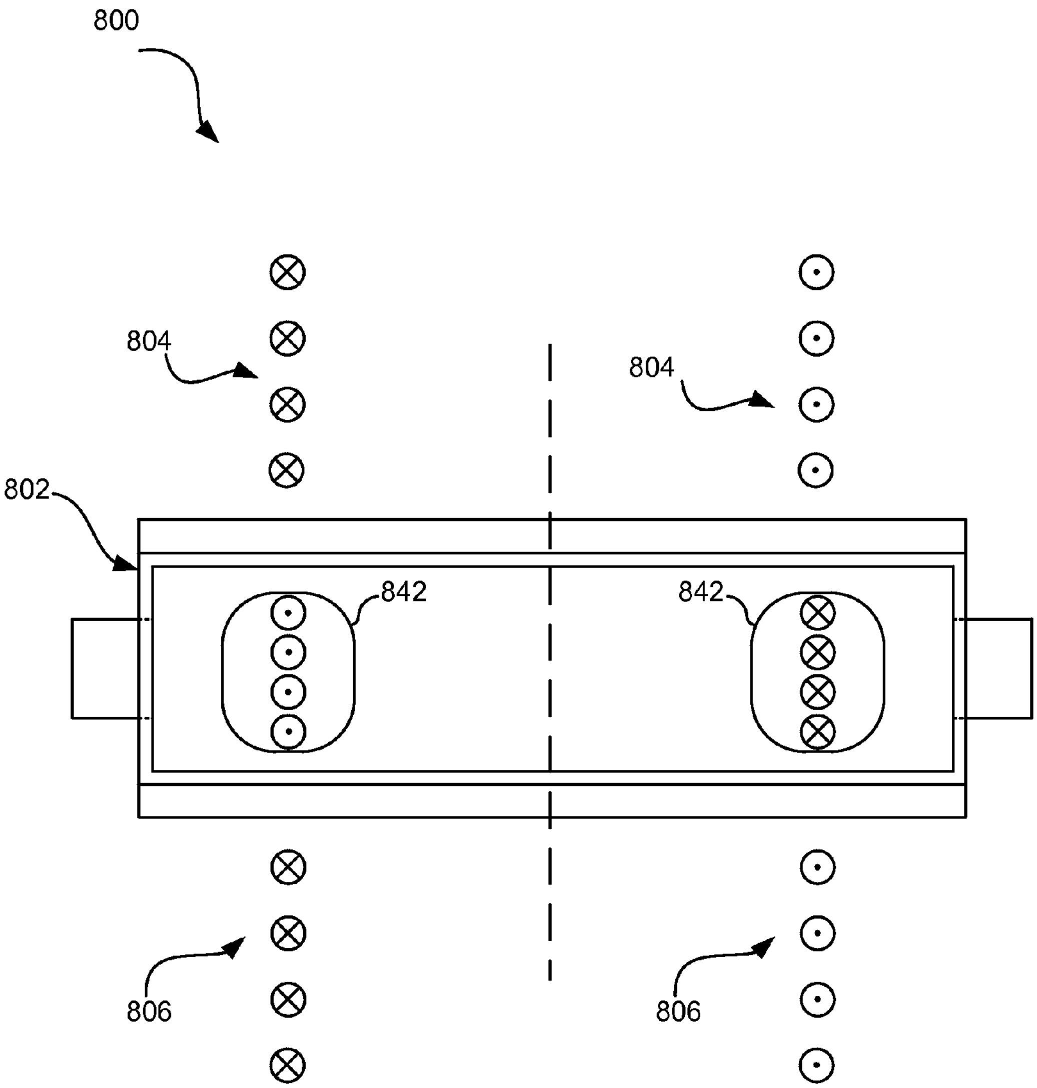
FIG. 6 illustrates a profile view of an embodiment of a remote plasma source having conductors arranged in two vertical coils.
Figure 7:
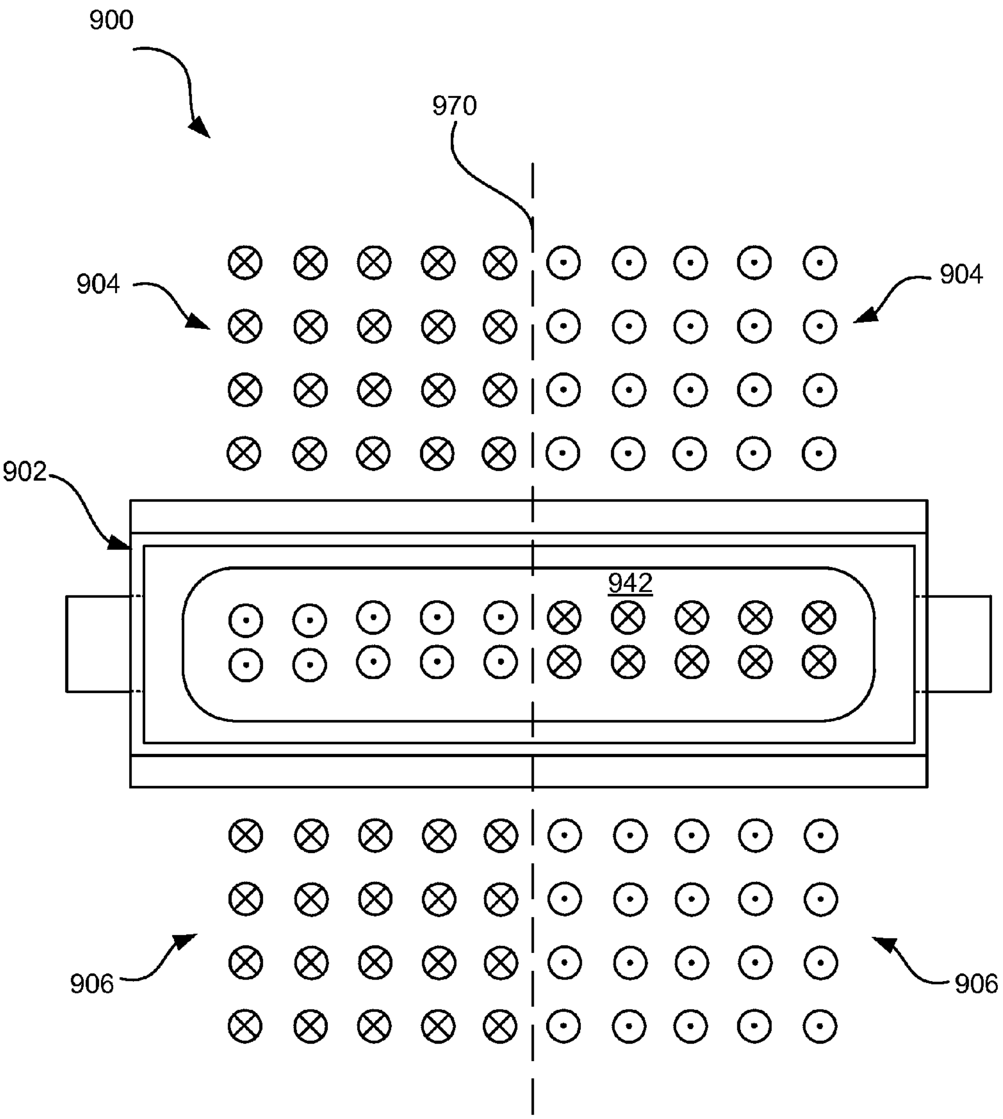
FIG. 7 illustrates a profile view of an embodiment of a remote plasma source having conductors arranged in a radial and vertical configuration.

In other embodiments, the conductors 404, 406 can be arranged radially (see for example, FIG. 4), vertically (see for example, FIG. 6), or in a combination of radial and vertical geometries (see for example, FIG. 7). And the first conductor 404 can have a current direction opposite to that in the second conductor 406.

Figure 3A:
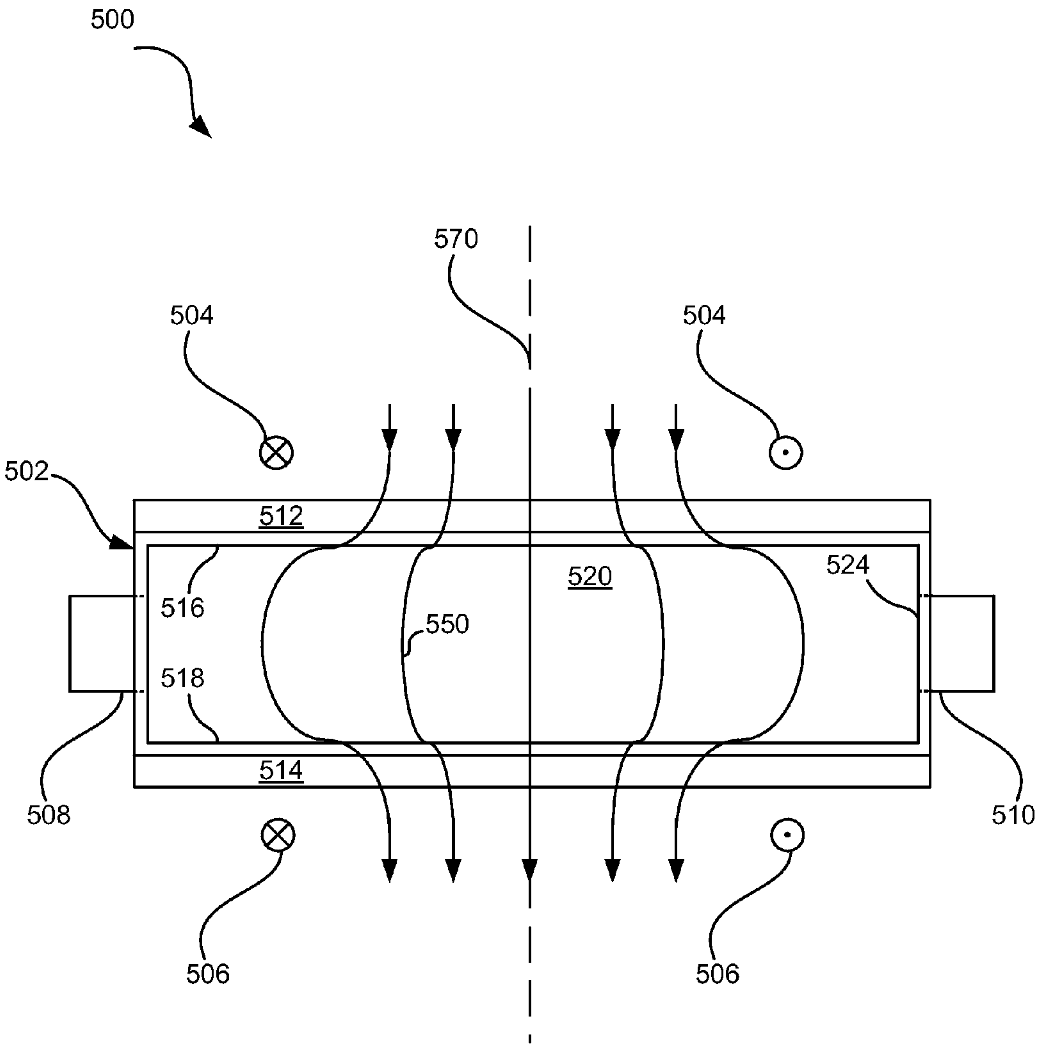
FIG. 3A illustrates a profile view of an embodiment of a remote plasma source showing magnetic field lines generated by the conductors.

FIG. 3A illustrates a profile view of an embodiment of a remote plasma source 500 showing magnetic field lines generated by the conductors. In the illustrated embodiment, a magnetic field 550 is directed from the first conductor 504 towards the second conductor 506. When the AC current generating the magnetic field 550 flips polarity, the magnetic field 550 is directed from the second conductor 506 towards the first conductor 504. In other words, the direction of current in the conductors 504, 506 determines the direction of the magnetic field 550. Between the conductors 504, 506 in the vertical dimension, the magnetic field 550 partially leaks out past a radius of the conductors 504, 506. The result is that the magnetic field 550 strength within the volume 520 has a profile resembling a curved hour glass—the magnetic field 550 is strongest closest to the first and second inner surfaces 516, 518 and weakest halfway between the conductors 504, 506. But magnetic field 550 strength in the radial direction is greatest close to the axis 570 and gets weaker moving away from the axis 570 and towards the third inner surface 524. This magnetic field 550 induces electric fields that circle the axis 570 in a direction opposite to that of the currents in the conductors 504, 506.

Figure 3B:
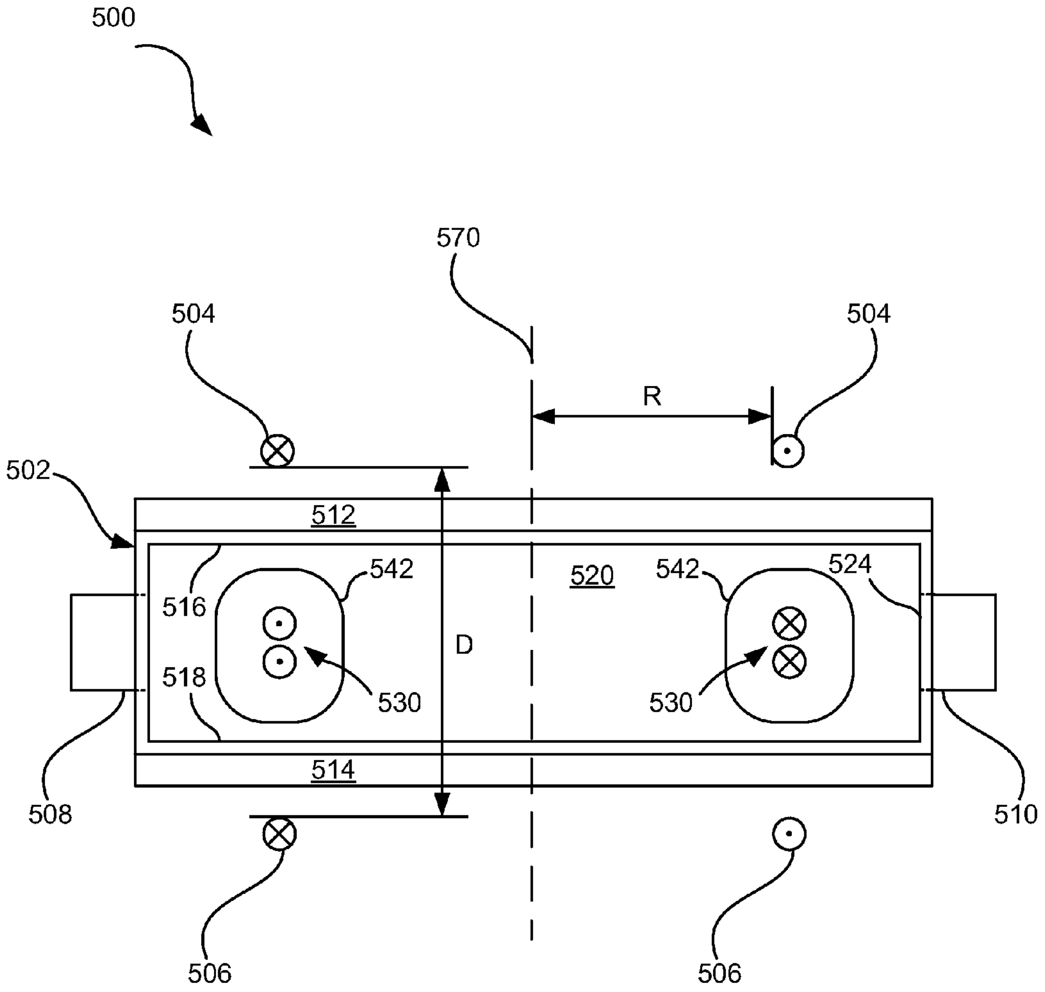
FIG. 3B illustrates a profile view of an embodiment of a remote plasma source showing electric field lines in a plasma that are induced by the magnetic field illustrated in FIG. 3A.

FIG. 3B illustrates a profile view of an embodiment of the remote plasma source 500 showing electric field lines in a plasma that are induced by the magnetic field illustrated in FIG. 3A. Since the magnetic field lines are directed downwards in the illustrated embodiment, the induced electric field lines 530 (FIG. 3B) go into the page on the right and out of the page on the left. This is the opposite direction to the currents in the conductors 504, 506. In other words the induced electric fields 530 image the currents in the conductors 504, 506. These induced electric fields 530 in turn push a current in the plasma 542 in the same direction as the induced electric fields 530. Thus, the induced electric fields 530 symbols in FIG. 3B overlap with the symbols for the induced current. Hereinafter, terminology for the induced electric fields 530 and the induced current will be used interchangeably.

The induced electric fields 530 in this embodiment ionize non-activated gas that is introduced into the volume 520 and sustain the plasma 542. The plasma 542 tends to have a profile that matches that of the induced electric fields 530. However, the plasma profile can be larger than the induced electric fields 530 profile due to plasma diffusion. In other words, while the induced electric fields 530 ionize the non-activated gas and generate the plasma 542, some of the plasma 542 spreads out or diffuses from ionization locals.

This diffusion is responsible for one of two types of plasma confinement that embodiments described herein enable. The first type of plasma confinement is radial—the forces and circumstances that minimize the amount of plasma 542 that contacts the third inner surface 524. The second type of plasma confinement is vertical—the forces and circumstances that minimize the amount of plasma 542 that contacts the first and second inner surfaces 516, 518.

Radial confinement is an issue since magnetic fields in the plasma 542 create radially-expansive forces on the plasma 542. Without a countervailing force, the plasma 542 would substantially contact the third inner surface 524 and etch it. But because plasma cannot exist long without being sustained by the induced electric fields 530, the plasma 542 is extinguished as it diffuses and expands radially away from the induced electric fields 530. As a consequence, although there is a force pushing the plasma 542 to expand radially towards the third inner surface 524, the plasma 542 is extinguished before it reaches the third inner surface 524. Thus, as long as the conductors 504, 506 are located at a radius that is not too close to the radius of the third inner surface 524, the plasma can be considered radially confined and will not substantially etch the third inner surface 524.

Vertical confinement prevents the plasma 542 from substantially contacting the first and second inner surfaces 516, 518. This confinement is due to two effects: (1) vertical smearing of the plasma and thus decreased plasma density due to the use of two conductors 504, 506 rather than just one conductor; and (2) an optimized conductor 504, 506 loop radius R versus a conductor-gap distance D that creates a situation where plasma potential energy is minimized midway between the conductors 504, 506.

Vertical smearing of the plasma results from the use of the two conductors 504, 506 arranged on opposite sides of the plasma 542. Recall from FIG. 3A that the magnetic field 550 strength is strongest near the first and second inner surfaces 516, 518. If there were only one conductor, then the magnetic field strength would be strongest near the inner surface closest to the conductor. In that case, the plasma density would be greatest against that inner surface and gradually decrease the further from the first inner surface the plasma gets. The plasma would thus be sucked up against the first inner surface and etch it. This is essentially what happens in known inductive single-coil non-remote plasma sources.

In order to better confine the plasma 542 and pull it off the first inner surface 516, the second conductor 506 is added. Now, the magnetic field 550 strength is strongest near the first and second inner surfaces 516, 518. Instead of the bulk of the magnetic field 550 strength existing near the first inner surface 516, the magnetic field 550 is smeared in the vertical dimension such that it bunches up against both the first and second inner surfaces 516, 518. The effect of using two conductors 504, 506 is thus to lower the magnetic field 550 strength near both of the inner surfaces 516, 518 as compared to the situation where either conductor 504, 506 was used by itself. Since the magnetic field 550 strength is reduced, the induced currents at the induced electric fields 530, and thus plasma 542 density, are also reduced. So, although the plasma 542 is still expected to contact the first and second inner surfaces 516, 518, the plasma 542 density making contact is expected to be much less than if only a single conductor 504, 506 is used. In other words, the plasma 542 is smeared in the vertical direction (e.g., it has a smaller density gradient) when two conductors 504, 506 are used instead of just one. Thus, the use of the two conductors 504, 506 advantageously decreases the plasma 542 density near the first and second inner surfaces 516, 518 to assist in vertical confinement.

But Applicants discovered that vertical confinement is even better than predicted. The added confinement is unexpectedly due to minimized plasma 542 potential in the middle of the volume 520 halfway between the first and second inner surfaces 516, 518. As noted above, one would expect the plasma 542 to have the greatest density near the first and second inner surfaces 516, 518. Yet, as seen in FIG. 5B, this expectation does not manifest itself in practice. Rather, the induced electric fields 530 are strongest near the midpoint between the conductors 504, 506—where the magnetic field 550 is weakest. This unexpected result can be explained by looking at the potential energy of the plasma. Normally an induced current in a plasma images the conductor that induced the magnetic field that is responsible for the induced current. However, when a second conductor is used, the induced current images two conductors and can do so with the least amount of energy when the induced current resides at a midpoint between the two conductors. Hence, the vertical confinement of the induced electric fields 530 and the plasma 542.

Vertical confinement can be optimized via a unique frequency-dependent relationship between a radius R of the conductors 504, 506 and a distance D between the conductors. The radius R is measured from the axis 570 to an inside edge of the conductors 504, 506. Frequency-dependent means that the optimum relation between R and D depends on the AC frequency in the conductors 504, 506.

The currents induced by the induced electric fields 530 also induce magnetic fields (not illustrated) that circle the induced electric fields 530. As the distance D gets smaller (i.e., the first and second conductors 504, 506 are moved closer to each other), these induced magnetic fields can gradually start to cancel the magnetic field 550. At a certain distance D, the induced magnetic fields cancel the magnetic field 550.

In other embodiments, the conductors 504, 506 can be arranged radially (see FIG. 4), vertically (see FIG. 6), or in a combination of radial and vertical geometries (see FIG. 7). In each of these configurations, the single-loop configuration illustrated in FIG. 2 with physics as described with reference to FIGS. 3A and 3B, roughly approximates a single loop of these coiled configurations, which is helpful to provide an understanding of the spiral-type, multiple-loop embodiments described further herein in connection with FIGS. 4, 6 and 7. For example, the physics behind the embodiments in FIGS. 4, 6 and 7, may be better understood by considering the superposition of multiple loops (such as the loops described with reference to FIGS. 3A and 3B) that each have a different radius R.

Figure 4:
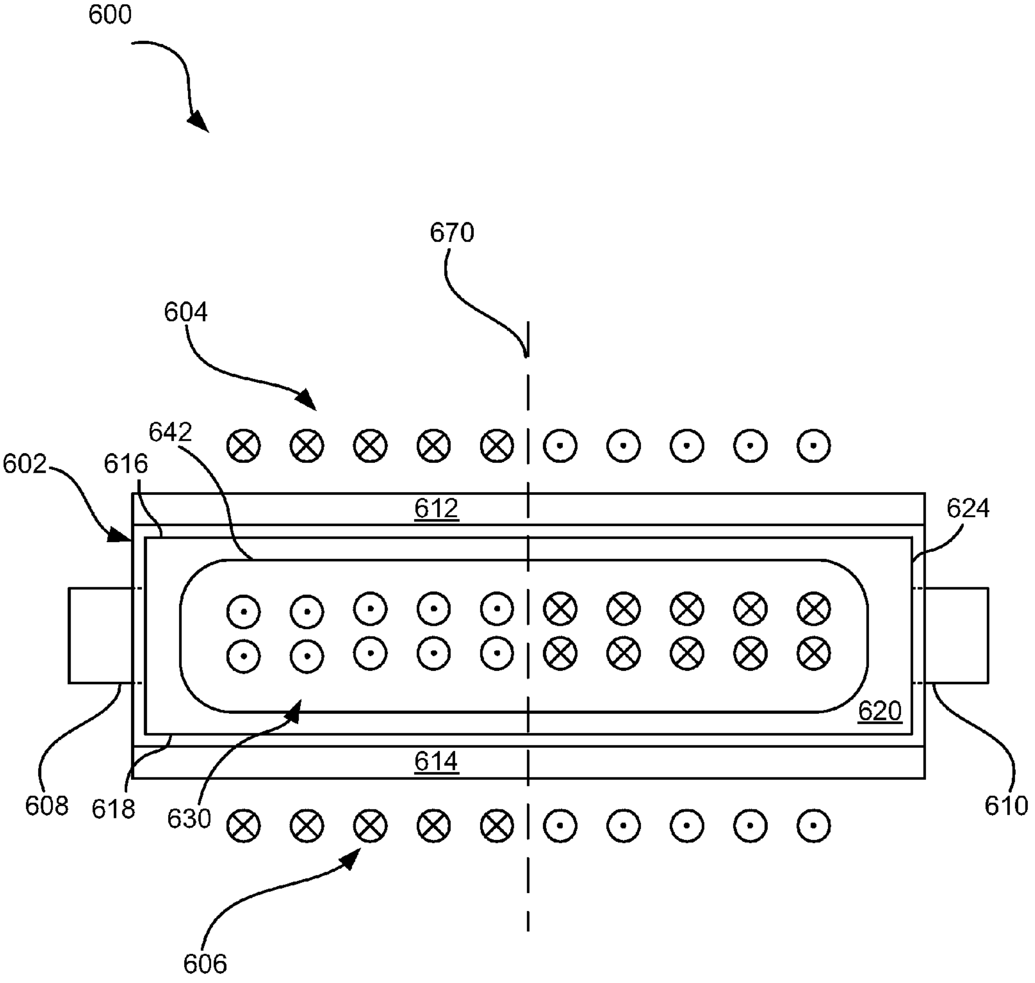
FIG. 4 illustrates a profile view of an embodiment of a remote plasma source having conductors arranged in two radial coils.

FIG. 4 illustrates a profile view of an embodiment of a remote plasma source depicting a cross-section of conductors that are arranged in two radial coils. When viewed from above, the conductors 604, 606 have a spiral shape, and when viewed in profile, as in FIG. 4, the conductors 604, 606 are planar—they are parallel to the first and second inner surfaces 616, 618. In this embodiment, current in the conductors 604, 606 can be passed from the outermost loops towards the innermost loops or vice versa. The induced currents 630 in the plasma 642 image the currents in the conductors 604, 606. When the radius of the innermost loops are close enough together, as for example in the illustrated embodiment, the plasma 642 forms a disc that is filled with plasma near the axis 670. In other words, there is no absence of plasma at the axis. But in other embodiments, the innermost loops do not have to be so close together. For example, the innermost loops can have a radius such that plasma is substantially absent near the axis 670 so that the plasma disc can be shaped like a washer.

As compared to the single-loop embodiment described with reference to FIG. 2, this embodiment can generate a plasma disc having a much greater cross section for the non-activated gas to pass through. As a consequence, greater dissociation of the non-activated gas is achieved with this embodiment. At the same time, the radial remote plasma source 600 can generate a larger volume of plasma 642, but use the same power input as the single-loop embodiment of FIG. 2. The plasma 642 therefore has a lower power density than in the single-loop embodiment, and a lower power density means fewer highly-charged ions bombarding the inner surfaces 616, 618, 624 of the remote plasma source chamber 602. Spreading the plasma 642 radially also means that the surface area where plasma 642 contacts the first and second inner surfaces 616, 618 is greater than in the single-loop embodiment. Spreading the same plasma over a larger surface area results in less plasma density and thus less etching of the first and second inner surfaces 616, 618.

The gas entry 608 can be arranged at a position and angle tangential to the outermost conductors. In other words, assuming an imaginary cylinder passing through both outermost conductors, the gas entry 608 can be aligned tangential to the imaginary cylinder. Gas entry 608 can release non-activated gas into the volume 620 parallel to the conductors 604, 606 and at any angle between tangential to the plasma 642 and directed at the axis 670. In other words, the non-activated gas can be directed at any point on the plasma 642 disc, but preferably not directed at the axis 670. This helps to establish a circulating gas and plasma 642 flow.

In the depicted embodiment, the plasma can be electrostatically ignited. For example, before any plasma exists in the volume 620, an electric potential can be formed between the first and second conductors 604, 606. This potential creates an electric field through the volume 620. When the field is strong enough it begins to ionize atoms and break apart molecules. Each ionized atom and ripped-apart molecule shoots off electrons and other particles that further ionize surrounding atoms and split surrounding molecules. Ignition is thus a run-away process that feeds off itself until the non-activated gas in the volume 620 is largely converted to the plasma 642.

Figure 5:
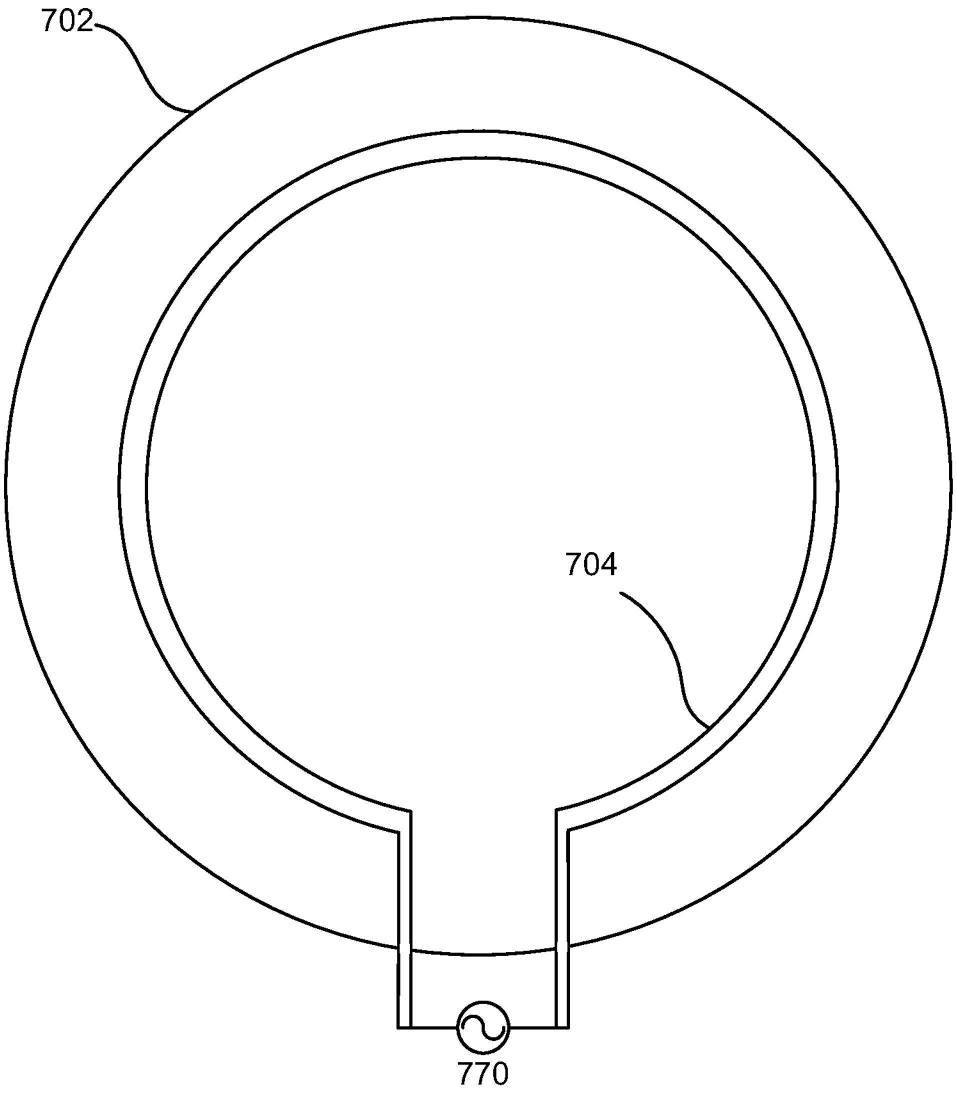
FIG. 5 illustrates an overhead view of an embodiment of a remote plasma source having a circular first conductor connected to an AC source.

FIG. 5 illustrates an overhead view of an embodiment of a remote plasma source having a circular first conductor connected to an AC source. The chamber 702 resides between the first conductor 704 and the second conductor (not visible). The first conductor 704 and second conductors are biased by an AC source 770. For the purposes of this illustration, only the first conductor 704 will be described, but it is to be understood that all descriptions of the first conductor 704 also apply to the non-visible second conductor.

The AC source 770 can pass AC current through any portion of the first conductor 704. For instance, in the illustrated embodiment, AC current passes through the entire first conductor 704. In another embodiment, the AC source 770 can be connected to the first conductor 704 such that AC current only passes through 90% of the first conductor 704, for example. That portion of the first conductor 704 that current does not pass through can be at the same potential as a closest point on the first conductor 704 through which AC current passes. This portion or length of the first conductor 704 in which current does not pass, and where the potential is constant, can be referred to as a pigtail. The pigtail can comprise any length or portion of the first conductor 704.

If the first conductor 704 is coiled, the pigtail can either comprise an inner portion of the coil towards the center or another portion of the coil towards the outer radius of the first conductor 704. In an embodiment, the pigtail is used to electrostatically ignite the plasma, and more than one pigtail can be made from the first conductor 704.

FIG. 6 illustrates a profile view of an embodiment of a remote plasma source having conductors arranged in two vertical coils. The first and second conductors 804, 806 in this embodiment are solenoids. The description of the fields and function of FIG. 6 is similar to that described relative to FIGS. 1-4.

But an advantage of the remote plasma source 800 is that electrostatic coupling drops off faster as a function of distance from the plasma 842 than inductive coupling. Hence, as each loop of the first and second conductors 804, 806 are arranged further and further from the plasma 842, the electrostatic coupling component is less than the inductive coupling component for each loop. Thus, the remote plasma source 800 allows a greater percentage of the power coupled into the plasma 842 to be inductively rather than electrostatically coupled.

FIG. 7 illustrates a profile view of an embodiment of a remote plasma source having conductors arranged in a radial and vertical configuration. The remote plasma source 900 takes advantage of the increased ratio of inductive to electrostatic coupling made possible via vertical stacking of the first and second conductors 904, 906 as described with reference to FIG. 6, and the increased cross section and plasma confinement of the planar disc plasma 942 made possible via radial coiling of the first and second conductors 904, 906 as described with reference to FIG. 4.

Those skilled in the art can readily recognize that numerous variations and substitutions may be made in the invention, its use, and its configuration to achieve substantially the same results as achieved by the embodiments described herein. Accordingly, there is no intention to limit the invention to the disclosed exemplary forms. Many variations, modifications, and alternative constructions fall within the scope and spirit of the disclosed invention.

What is claimed is:

1. A remote plasma source comprising:

a first inductive coil having a first plurality of loops, the first plurality of loops having an average radius R1;

a second inductive coil having a second plurality of loops, the second plurality of loops having the average radius R1, wherein the first and second inductive coils are parallel to each other and separated by a distance D, wherein the first and second inductive coils are configured to conduct an alternating current to generate magnetic fields that sustain a disc-shaped plasma between the first and second inductive coils, wherein the alternating current sustains the disc-shaped plasma primarily through inductive coupling;

a chamber disposed between the first and second inductive coils, and configured to enclose the disc-shaped plasma;

a first dielectric layer parallel to the first and second inductive coils and disposed between the chamber and the first inductive coil, wherein the first dielectric layer is configured to reduce capacitive coupling between the first inductive coil and the disc-shaped plasma and allow the magnetic fields to pass from the first inductive coil to the disc-shaped plasma; and a second dielectric layer parallel to the first and second inductive coils and arranged between the chamber and the second inductive coil, wherein the second dielectric layer is configured to reduce capacitive coupling between the second inductive coil and the disc-shaped plasma and allow the magnetic fields to pass from the second inductive coil to the disc-shaped plasma;

a gas entry connected to the chamber and configured to provide non-activated gas to the chamber; and a gas exit connected to the chamber and configured to enable activated gas and free radicals to exit the chamber.

2. The system of claim 1, wherein the first and second inductive coils are solenoid-shaped inductors.

3. The system of claim 1, wherein the first and second inductive coils are planar inductors.

4. The system of claim 1, wherein the first and second inductive coils comprise two or more windings stacked vertically like a solenoid and two or more windings arranged in a planar dimension.

5. The system of claim 1, wherein the gas entry is arranged to provide the non-activated gas in a direction parallel to the first and second inductive coils and intersecting a portion of the disc-shaped plasma.

6. The system of claim 1, wherein the disc-shaped plasma has a plasma density that increases towards a center of the chamber.

7. A method comprising: providing a reactive gas to a remote plasma source chamber through a gas entry connected to the chamber that is configured to provide reactive gas to the chamber;

passing a high voltage current through a first inductor and a second inductor to generate an electric field passing from the first inductor through a first dielectric layer, through the remote plasma source chamber, through a second dielectric layer, and to the second inductor, wherein the electric field is strong enough to ignite a plasma in the reactive gas in the remote plasma source chamber;

passing an alternating current through the first inductor and the second inductor to inductively induce mirror electric fields in the plasma, wherein the induced mirror electric fields propagate in an opposite direction to the alternating current, and wherein the induced mirror electric fields sustain the plasma; and dissociating the reactive gas by passing it through the plasma to form activated gas and free radicals; and removing the activated gas and free radicals from the remote plasma source chamber through a gas exit connected to the chamber that is configured to enable the activated gas and free radicals to exit through the chamber.

8. The method of claim 7, further comprising directing an alternating magnetic field between the first and second inductors in a direction perpendicular to a first inner surface and a second inner surface of the remote plasma chamber.

9. The method of claim 7, wherein the alternating magnetic field has an equivalent field density at the first and second inner surfaces of the remote plasma chamber.

10. A system comprising:

a remote plasma source chamber having parallel first and second surfaces;

a first coiled conductor arranged outside the remote plasma source chamber and adjacent to the first surface of the remote plasma source chamber, wherein the first coiled conductor generates a first magnetic field directed into the remote plasma source chamber and primarily in a first direction perpendicular to the first and second surfaces;

a first dielectric arranged between the first surface and the first coiled conductor;

a second coiled conductor arranged outside the remote plasma source chamber and adjacent to the second surface of the remote plasma source chamber, wherein the second coiled conductor generates a second magnetic field primarily in the first direction;

a second dielectric arranged between the second surface and the second coiled conductor;

a reactive gas entry that directs a reactive gas into the remote plasma source chamber in a second direction tangential to an outermost portion of the first coiled conductor and perpendicular to the first direction; and a radicals exit port that removes radicals formed when the reactive gas is passed through a plasma disc formed in the remote plasma source chamber.

* * * * *